(12) United States Patent
Knapp et al.

(10) Patent No.: US 12,626,057 B2
(45) Date of Patent: May 12, 2026

(54) DOCUMENT FORM EXPORT SYSTEM

(71) Applicant: Metcalf Archaeological Consultants, Inc., Golden, CO (US)

(72) Inventors: Dante Lee Knapp, Fort Collins, CO (US); Jiayi Liu, Mack, CO (US); Robert Matthew Martin, Westminster, CO (US); Eric Webb, Wichita, KS (US); William H. Page, Osprey, FL (US); Nathaniel David Boyless, Wheat Ridge, CO (US)

(73) Assignee: Metcalf Archaelogical Consultants, Inc., Golden, CO (US)

( * ) Notice: Subject to any disclaimer, the term of this patent is extended or adjusted under 35 U.S.C. 154(b) by 284 days.

(21) Appl. No.: 18/589,260

(22) Filed: Feb. 27, 2024

(65) Prior Publication Data

US 2024/0296281 A1     Sep. 5, 2024

Related U.S. Application Data

(60) Provisional application No. 63/551,490, filed on Feb. 8, 2024, provisional application No. 63/449,947, filed on Mar. 3, 2023.

(51) Int. Cl.
*G06F 40/186* (2020.01)
*G06F 40/174* (2020.01)

(52) U.S. Cl.
CPC .......... *G06F 40/186* (2020.01); *G06F 40/174* (2020.01)

(58) Field of Classification Search
CPC ...... G06V 30/412; G06V 10/24; G06V 10/48; G06V 30/414; G06V 30/416; G01N 33/50; G01N 33/573; G01N 33/68; G01N 1/00; G01N 33/60; G01N 33/53; G01N 33/535; G01N 33/558; G01N 33/567
See application file for complete search history.

(56) References Cited

U.S. PATENT DOCUMENTS

| | | | |
|---|---|---|---|
| 7,313,540 B1 * | 12/2007 | Hueler | G06Q 40/08 |
| | | | 705/52 |
| 8,452,676 B1 | 5/2013 | Talan | |
| 8,838,980 B2 | 9/2014 | Gonser | |
| 10,394,948 B2 | 8/2019 | Brisebois | |
| 10,460,024 B2 | 10/2019 | Gaither | |
| 10,592,688 B2 | 3/2020 | Reicher | |
| 10,706,176 B2 | 7/2020 | Brannon | |

(Continued)

FOREIGN PATENT DOCUMENTS

AU     2010219430 B2     3/2011

OTHER PUBLICATIONS

Bringing together content and data management systems: Challenges Somani, (Year: 2002).*

(Continued)

*Primary Examiner* — Rayeez R Chowdhury
(74) *Attorney, Agent, or Firm* — Stinson LLP

(57) ABSTRACT

Systems and methods to record, process, and finalize documents such as forms from customized form input data into submission-ready selectable document forms are provided. Data entries are received and mapped to a set of user-defined data field templates. Data mutation export actions are performed to bring data entries into conformance with requirements of the submission-ready selectable document form.

18 Claims, 6 Drawing Sheets

(56) References Cited

U.S. PATENT DOCUMENTS

| | | | | |
|---|---|---|---|---|
| 10,796,081 | B2 | 10/2020 | Kharbanda | |
| 10,796,082 | B2 | 10/2020 | Jensen | |
| 2001/0054068 | A1* | 12/2001 | Modiano | H04L 9/40 |
| | | | | 709/203 |
| 2017/0286389 | A1 | 10/2017 | Ceneviva | |
| 2017/0357628 | A1 | 12/2017 | Hurley | |
| 2020/0380202 | A1 | 12/2020 | Cass | |
| 2021/0149992 | A1* | 5/2021 | Nam | G06F 40/169 |
| 2021/0240786 | A1 | 8/2021 | Nicholas | |
| 2022/0245328 | A1 | 8/2022 | Tsabba | |
| 2022/0374249 | A1* | 11/2022 | Nair | G06Q 10/10 |

OTHER PUBLICATIONS

Description of the useContext React Hook, https://react.dev/reference/react/useContext, visited Apr. 6, 2024.
International Searching Authority, International Search Report and Written Opinion mailed Jun. 5, 2024 in PCT/US2024/017764.

* cited by examiner

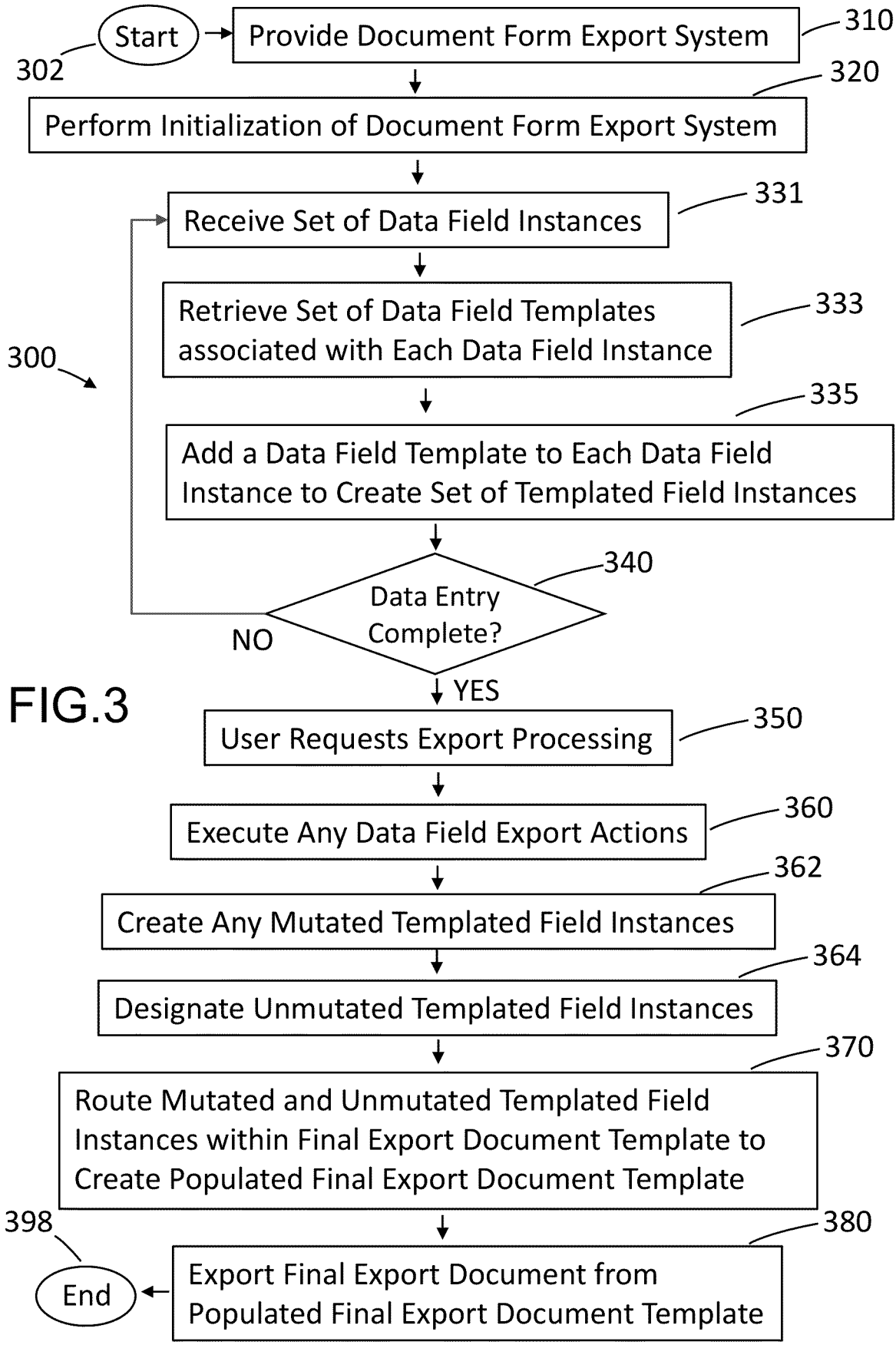

Start 302 → Provide Document Form Export System 310

Perform Initialization of Document Form Export System 320

Receive Set of Data Field Instances 331

Retrieve Set of Data Field Templates associated with Each Data Field Instance 333

Add a Data Field Template to Each Data Field Instance to Create Set of Templated Field Instances 335

Data Entry Complete? 340     NO     YES

FIG.3

User Requests Export Processing 350

Execute Any Data Field Export Actions 360

Create Any Mutated Templated Field Instances 362

Designate Unmutated Templated Field Instances 364

Route Mutated and Unmutated Templated Field Instances within Final Export Document Template to Create Populated Final Export Document Template 370

Export Final Export Document from Populated Final Export Document Template 380

End 398

300

400

| Feature | Latitude | Longitude | Cultural Feature? (box check if so) |
|---|---|---|---|
| Firepit | X1°, X2′, X3″ | Y1°, Y2′, Y3″ | ✓ |
| Oak Tree | X5°, X6′, X7″ | Y5°, Y6′, Y7″ | |

401

| Geo Zone | Cultural Feature? | Latitude, Longitude | Comment |
|---|---|---|---|
| 1 | YES | X1.xxxx4, Y1.yyyy4 | firepit |
| 2 | | | |
| Other | NO | X5.xxxx8, Y5.yyyy8 | Oak Tree |

Form Templates 21

Form Group = Σ (Forms Templates)

Field Templates 22
[Form = Σ (Field Templates)]

Field Actions 23

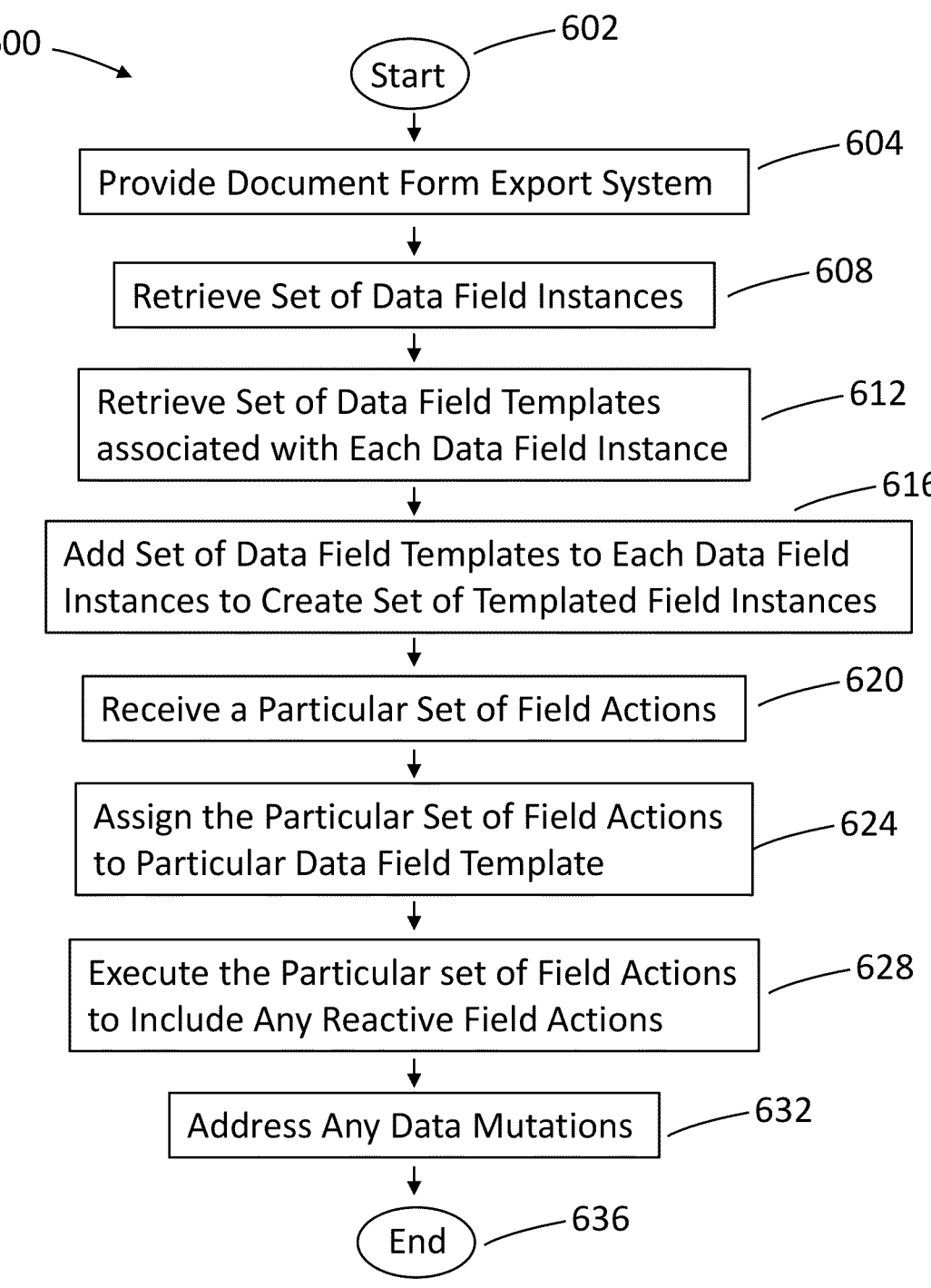

600

602
Start

604
Provide Document Form Export System

608
Retrieve Set of Data Field Instances

612
Retrieve Set of Data Field Templates associated with Each Data Field Instance 616
Add Set of Data Field Templates to Each Data Field Instances to Create Set of Templated Field Instances 620
Receive a Particular Set of Field Actions 624
Assign the Particular Set of Field Actions to Particular Data Field Template 628
Execute the Particular set of Field Actions to Include Any Reactive Field Actions 632
Address Any Data Mutations 636
End

FIG.6

DOCUMENT FORM EXPORT SYSTEM

CROSS-REFERENCE TO RELATED APPLICATION

This application is a nonprovisional patent application of and claims the benefit of U.S. Provisional Patent Application No. 63/449,947 titled "Document Form Export System" filed Mar. 3, 2023, and U.S. Provisional Patent Application No. 63/551,490 titled "Customized Field Action Template System of a Document Form Export System" filed Feb. 8, 2024, the disclosures of both are hereby incorporated herein by reference in entirety.

FIELD

The disclosure relates generally to systems and methods involving document form exporting, and specifically to systems and methods to record, process, and finalize documents such as forms from customized form input data into submission-ready document forms.

BACKGROUND

The process of digitizing forms requires accommodation of any existing systems in a paper/handwritten form system. Forms should be somewhat mutable and allow users to determine what is really needed from a form in a certain circumstance. Government or reporting agencies spend a lot of time and resources designing forms to be cohesive and effective enough to gather as much information as possible in the shortest amount of time possible. This is a difficult task because a particular agency does not know the exact circumstances or requirements of the varied situations that a user will encounter. Such circumstances or requirements will only be determined when the user is in that situation, attempting to complete a task or collect an adequate amount of data. What is needed is a document form export system that can tailor any form to a user's specific needs based on any particular situation. The resulting forms to be rendered must be adaptable to the ideas, workflow and management style of the user recording the data. The result of a digitized form needs to meet many different criteria and be adaptable to changes as though one was changing a paper form.

The disclosed document form export system solves these needs and creates new efficiencies across many different areas once basic process requirements are met. The document form export system addresses such requirements and allows additional form customization while meeting the strict and at times changing requirements of the final result (an export document).

A purpose of the document form export system is to allow users to record, process, and finalize submission-ready forms in a digital process.

The document form export system receives user-defined/filled form content as a structured format, e.g., JSON, and a pointer to an export template. The system then mutates the data in specific ways to be inserted into an end product that meets predefined requirements set by the form's creator.

The document form export system uses an action statement stored with the form template to prepare the data to meet the predefined criteria specific to a template. These predefined criteria for customization vary and are selected from customizations that are supported using the action statement. This modular system allows customizations for anything clients need in the export. Each customization has a module that recognizes the action statement associated with a form element and performs the script to mutate that set of data, then continues the process until all actions are complete. Lastly, the system fills the predefined template with the finished data, and sends a download with the final export to the client.

SUMMARY

Systems and methods to record, process, and finalize documents such as forms from customized form input data into submission-ready selectable document forms are described. Data entries are received and mapped to a set of user-defined data field templates. Data mutation export actions are performed to bring data entries into conformance with requirements of the submission-ready selectable document form. In one aspect, a customized field action feature enables dynamic and customizable data field templates. Users may design a data collection document particular to their data collection process, while still meeting the requirements of a regulatory environment with an export form.

An example of digitized form activity in a regulatory requirement is the exported forms that satisfy requirements of a State Historic Preservation Office (SHPO) for acceptance for CRM (Cultural Resource Management) projects across states. Another example are the forms used by government agencies to audit regulated resources/assets.

As a practical illustration of the document form export system of the disclosure, the following user story is provided:

In the cultural resource management industry, the site reporting team consists of a Project Manager (PM), the field crews and the office workers. Typically, the field crews will perform the data recording tasks out in the field, while the PM and the office workers will divide the workload of final editing and reviewing of the form data.

A Project Manager is getting ready for data collection. With knowledge of the regulatory environment and type of data that will be collected, the PM creates data collection document templates to be used for the data collection. This PM is going to have two teams of recorders and decided to split up the forms between them. To help the two teams stay focused, the PM sets up their data collection documents to only contain the fields they will be directly working with. The crews fill out each data collection document in the field and sync the data collection documents to the cloud when they have Wi-Fi. Crew members can also collaborate offline using the system's in-field synchronization feature.

Once the data syncs, another team member back at the office can begin editing the data. At some point, the reviewer asks another coworker to help edit a form, and the coworker helps edit using the collaborative work interface. Now they can both edit the same data and see each other's edits, all in real-time.

Once all the edits are complete, and the reviewer is ready to submit the forms to the regulatory agency, they select which groups of data they want to export and initiate the export. Now while the forms are processed and built into the proper format; a progress bar will indicate the completion of the process, and the system will prompt the user to download a zip file containing all the finished forms.

In one embodiment, a method of using a document form export system is disclosed, the method comprising: providing a document form export system comprising: a system database having a non-transitory computer-readable storage medium, the system database configured to store system data, the system data comprising at least one final export document template and a set of forms, each form comprising a set of data field templates configured to be added to a data field instance, at least one of the set of data field templates having a data field export action; a logic engine comprising a computer processor, the processor operating on the system database; and a user interface; receiving, by the processor, a set of data field instances; retrieving a data field template associated with each of the data field instances; adding the data field template associated with each of the data field instances to each of the data field instances to create a set of templated field instances, the set of templated field instances comprising at least one templated field instance with an associated data field export action and a set of templated field instances not associated with any data field export action; executing the associated data field export action of at least one templated field instance with an associated data field export action to create a mutated templated field instance; designating the set of templated field instances not associated with any data field export action as unmutated templated field instances; receiving a selection of a particular final export document template; routing the mutated templated field instance and the unmutated templated field instances to particular data locations within the particular final export document template to create a populated final export document; and creating, from the populated final export document, a final export document.

Note that the final exported document may be a form group of multiple different types of forms, wherein the final export document is created from the sum of all populated final export documents.

In one aspect, the final export document is one of a pdf document and a word document. Note that other export types are possible, to include third party APIs, excel spreadsheets, and other types known to those skilled in the art. In another aspect, the data field export action converts a checkbox data element to a text element. In another aspect, at least one data field instance is alphanumeric data. In another aspect, the data field export action is a third party defined code. In another aspect, the data field export action is a picklist. In another aspect, the data field export action is a dropdown. In another aspect, the populated final export document is in JSON format.

In another embodiment, a document form export system is disclosed, the system comprising: a system database having a non-transitory computer-readable storage medium, the system database configured to store system data, the system data comprising at least one final export document template and a set of forms, each form comprising a set of data field templates configured to be added to a data field instance, at least one of the set of data field templates having a data field export action; a logic engine comprising a computer processor, the processor operating on the system database; and a user interface; wherein: the logic engine has machine-executable instructions operating to: receive, by the processor by way of the user interface, a set of data field instances; retrieve a data field template associated with each of the data field instances; add, by the processor, the data field template associated with each of the data field instances to each of the data field instances to create a set of templated field instances, the set of templated field instances comprising at least one templated field instance with an associated data field export action and a set of templated field instances not associated with any data field export action; execute, by the processor, the associated data field export action of the at least one templated field instance with an associated data field export action to create a mutated templated field instance; designate the set of templated field instances not associated with any data field export action as unmutated templated field instances; receiving, by the processor, a selection of a particular final export document template; route, by the processor, the mutated templated field instance and the unmutated templated field instances to particular data locations within the final export document template to create a populated final export document template; and create from the populated final export document, by the processor, a final export document.

In one aspect, the final export document is one of a pdf document and a word document. In another aspect, the data field export action converts a checkbox data element to a text element.

In one embodiment, a method of creating and using a customized field template of a document form export system is described, the method comprising: providing a document form export system comprising: a system database having a non-transitory computer-readable storage medium, the system database configured to store system data, the system data comprising a final export document template, a set of field actions, and a set of forms, each form comprising a set of data field templates configured to be added to a data field instance, the set of data field templates configured to receive the set of field actions, at least one of the set of field actions comprising a reactive field action; a logic engine comprising a computer processor, the processor operating on the system database; and a user interface; receiving, by the processor, a set of data field instances; retrieving a data field template associated with each of the data field instances; adding the data field template associated with each of the data field instances to each of the data field instances to create a set of templated field instances; receive, by the processor by way of the user interface, a particular set of field actions to assign to a particular data field template; assign the particular set of field actions to the particular data field template; execute the particular set of field actions to include the reactive field actions; and address any data mutations resulting from executing the particular set of field actions; wherein: the customized field template has been created and used.

In another embodiment, a customized field document form export system is described, the system comprising: a system database having a non-transitory computer-readable storage medium, the system database configured to store system data, the system data comprising a final export document template, a set of field actions, and a set of forms, each form comprising a set of data field templates configured to be added to a data field instance, the set of data field templates configured to receive a set of field actions, at least one of the set of field actions comprising a reactive field action; a logic engine comprising a computer processor, the processor operating on the system database; and a user interface; wherein: the logic engine has machine-executable instructions operating to: receive, by the processor by way of the user interface, a set of data field instances; retrieve a data field template associated with each of the data field instances; add, by the processor, the data field template associated with each of the data field instances to each of the data field instances to create a set of templated field instances; receive, by the processor by way of the user interface, a particular set of field actions to assign to a particular data field template; assign the particular set of field actions to the particular data field template; execute the particular set of field actions to include the reactive field actions; and address any data mutations resulting from executing the particular set of field actions; and a customized field template has been created and used.

In one embodiment, all or part of the document form export system requires internet connectivity.

By way of providing additional background, context, and to further satisfy the written description requirements of 35 U.S.C. § 112, the following references are incorporated by reference in their entireties: U.S. Pat. No. 10,796,081 to Kharbanda et al; U.S. Pat. No. 10,592,688 to Reicher et al; U.S. Pat. No. 8,452,676 to Talan et al; U.S. Pat. No. 10,796,082 to Jensen et al, U.S. Pat. No. 8,838,980 to Gonser et al; U.S. Pat. No. 10,394,948 to Brisebois et al; U.S. Pat. No. 10,706,176 to Brannon et al; and U.S. Pat. No. 10,460,024 to Gaither et al; U.S. Pat. Publ. No. 2017/0286389 to Ceneviva et al; 2020/0380202 to Cass et al; and 2021/0240796 to Nicholas et al; and Australian Pat. No. AU2010219430B2 to Treisman et al.

Note that data field template may have a range of export actions spanning zero to infinity.

The following is a glossary of user types, terminology, and field types:

Types of Users
  User—A person that uses the application for its primary functions.
  Project Manager—A user with special privileges to create and manage project specific forms and other project related functionality, can manage users within project.
  Business/Org Admi—A user with privileges to manage their own company/organization
  Group Admin—A user with privileges to create/modify default form templates and manage project managers within a group
  Admin—A user with privileges to create/modify groups.
  System Admin—A user with privileges to system related functions.
  SHPO—State Historic Preservation Office.
Forms Terminology
  Group—An individual state or organization that will control the form outputs and default forms.
  Business/Org—an individual organization that will have control over projects and its users
  Project—an entity that contains form groups and specific data/functionality related to the collection of form groups belonging to the aforementioned entity.
  Instance—an entity that is created to hold user edited data and is related to a template
  Data Collection Document—The digital representation of a form, AKA the front end.
  Form Group—group of forms, that will be bundled together. Parent entity to form instances and is in charge of setting up the fields initially.
  Form Group Type—for form group formatting. Default is Archaeological type
  Form Instance—The entity that contains all the field refs and form related data (aka Form Instance) for a subset group of fields of the form group.
  Form Element—An individual part of a form. (AKA field, section)
  Form Template—the metadata for a form to dictate how it will function and relationships to the field templates that belong to this form template. These can be created from scratch or based on a default form template.
  Form Template Type—The type of template describing if it's static or dynamic.
  Default Form Template—the master metadata for a form to dictate how it will function and refs to the field templates that belong to this template. This will be defined by a Group Admin and be set up to include everything needed for the final export to the defined output.
  Default Field Template—the master metadata for a field to dictate how it will function and refs to the field templates that belong to this template. This will be defined by a Group Admin and be set up to include everything needed for the final export to the defined output.
  Dynamic Form Template Type—a form in which fields are not limited by length, in other words the fields can expand.
  Static Form—a form in which fields are limited in length and are not able to expand.
  Embedded Static Form—a non-dynamic form that we use to collect data for internal things. (i.e., login form)
  Field—Entity consisting of a Field Template and a Field Instance that users can interact with to record data.
  Field Action—String action statement that determines special functionality for a specific field template.
  Field Group—group of forms, that will be bundled together. Parent entity to form instances and is in charge of setting up the fields initially.
  Field Instance (or Data Field Instance)—Entity that contains all the field data for the current instance of that field. (aka Field Instance). The bucket to hold the data mutable by the end user.
  Field Template (or Data Field Template)—the metadata for a field to dictate how it functions and references to configs if they exist
  Field Type—String designating type of field and generic field behavior that exists across many fields, i.e., text input field type. Examples (text, checkbox, dropdown, note etc.)
  Default Field Template—the master metadata for a field to dictate how it functions and refs to configs if they exist.
  Table—an entity that contains lists of refs to fields
  Table Template—an entity with table related data and refs to the field templates that belong in each row
  DOTX Template—a dotx file with content controls and formatting setup for forms to be exported in docx format.
  PDF Template—a pdf file with form fields and formattings set up to be exported in pdf format.
  API Template—a json or other type of document to determine how the data is parsed to export the form data to a third-party API.
  Content Controls—a word document entity used to control the data flowing into a word export.
  Blank Template—a dotx file that will allow populating a form template without having a defined output.
  Pre-Record Action—an entity that contains data or functionality, to customize the initialization of the field
  Export Action—an entity that contains operations designated by the export action property in the field template for final export functionality for field templates.
  Recording Action—an entity that contains operations designated by the recording action property for functionality during recording.
  Continuation Page—A special template that is provided by the agency to encapsulate any data that does not fit in the provided space for a field input in a static type template.
  Picklist—category of specific field types that use predetermined options that are selectable by the user.—checkbox, dropdown field types.
  Generic Input Methods—certain activities or functionality that inputs in js and html already have built in and are used by everyone that uses html inputs. (e.g., if you have a text input in the browser, you will always have certain methods attached to it that are an inherent part of that element).

React Context Hook—a hook provided by React that allows you to manage state globally. (e.g., a react tool that is provided to anyone that is using React; more documentation at: https://react.dev/reference/react/useContext).

Event Listener—an event listener is a function in various programming languages that waits for an event to occur then responds to it.

DOM—Document Object Model is a programming interface for web documents. It represents the page so that programs can change the document structure, style, and content.

Field Types

Text—standard text input

Note—text input that expands to allow more text and allow for rich text formatting.

Checkbox—one or more select "boxes" to allow data entry from preset options.

Dropdown—single or multiple selection "dropdown" lists to allow selection from preset options or custom values.

Number—a number input that allows incrementing the value by a predefined amount (—default 1)

Date—date field to pick date/time from the calendar

File—upload an image or other file to the form

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g., analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following brief description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 3 is a flow chart of one embodiment of a method of use of the document form export system of FIG. 1;

FIG. 6 is a flow chart of one embodiment of a method of use of the customized field action template system of FIG. 5 of a document form export system of FIG. 1.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Generally, the document form export system is dependent on various templates for forms to be created and configured separately for each export form type. The data will be stored on a centralized database within the cloud, and can be exported to other types of databases in other places. During offline situations, the data will be stored on the device's storage. The export process is made up of groups of smaller processes or modules, designed to exchange data and interact with data in predefined ways to generate outputs that retain original design and 100% data integrity. These smaller operations can be executed in several different ways and patterns to meet requirements.

Our society is built on the backbone of a bureaucracy that up until recently has relied heavily on the use and storage of data using paper forms. There are many private and public sector entities that need to convert to a digital workflow for efficiency, environmental purposes, and to better leverage technology in their respective workflows to address diminishing resources. This technology exists to create the same deliverable digitally that one would have from using a paper form.

The pre export process receives a request from a user containing the data they wish to export to a predefined output. Systems within the aforementioned process are designed to be flexible, reusable, and accommodate the internal and external requirements for the output. The data input will be in a structured format and can be customized by the individual user before this process. The system expects to receive collected data structured for mixed business uses.

Data to be processed is mutated and restructured to insert the data into predefined inputs with pointers and configurations stored in external documents or modules. Using various tools the system can generate various outputs, for example, with Office Open XML and PDF-Lib js. These mutations are required to meet the predefined output standards for data integrity and formatting.

The disclosed devices, systems, and methods of use will be described with reference to FIGS. 1-6. Generally, systems and methods to record, process, and finalize documents such as forms from customized form input data into submission-ready document forms are described.

Figure 1:
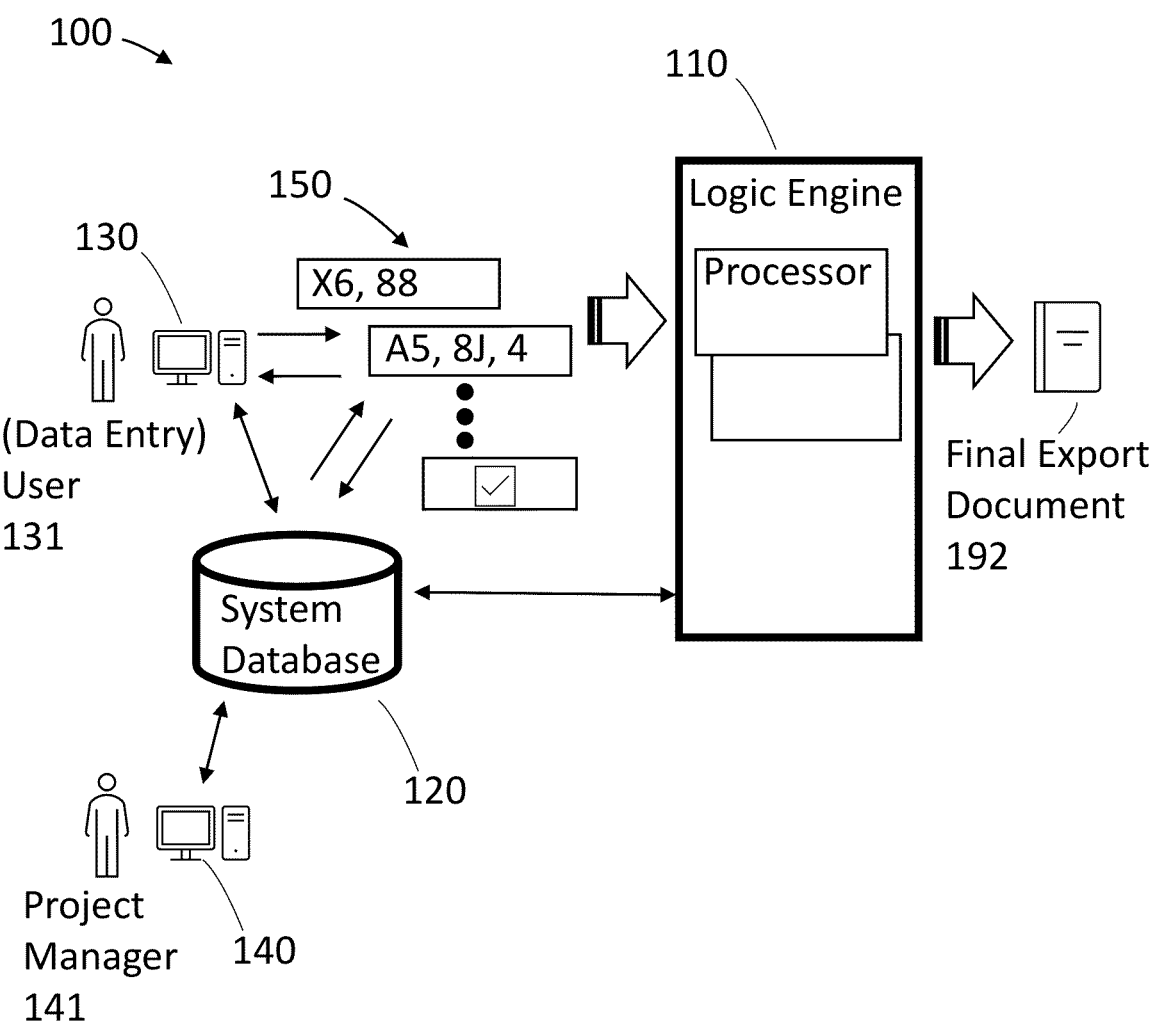
FIG. 1 is a depiction of one embodiment of a document form export system of the disclosure.

With attention to FIG. 1, one embodiment of a document form export system 100 is depicted. The "document form export system" may be referred to as "form export system" or "forms exports" or simply "system." With attention to FIGS. 2 and 3, embodiments of methods of use 200, 300 respectively of the document form export system 100 of FIG. 1 are depicted. The method of use of the document form export system may be referred to as "form export system method" or "system method" or simple "method." Stated another way, the phrases "form export" or "forms export" or simply the term "system," or the phrase "export method" or simply the term "method," may refer to any of the embodiments of the disclosure which involve any collection of the features described in the disclosure and is not limiting.

The document form export system 100 comprises a system database 120, logic engine 110 comprising a processor, and user interface 130. A data entry user 131 inputs data entries 150 by way of the user interface 130, and may be stored, e.g., in the system database 120 and/or the cloud. The data entries are received by the processor. The form or format of the data entries may be determined by files stored in the system database 120. The form or format of the data entries may comprise one or more customized forms.

In one embodiment, all or some data, such as data of the system database 120, is stored using "IndexedDB" and/or Amazon "DynamoDB."

The project manager 141, or other user, interacts with the system database or the system 100 by way of user interface 140. The processor operates on the system database 120. The data entries 150 are operated on by the processor 110 to output a final export document 192. The operations of the processor 192 on the data entries 150 are described below. Generally, the processor receives customized form input data 150 and outputs a submission-ready final export document 192.

Note that any or all of the user interfaces described, such as the user interface 130 and the user interface 140, may be a Graphical User Interface (GUI). (The phrase "user interface" or "UI", and the phrase "graphical user interface" or "GUI", means a computer-based display that allows interaction with a user with aid of images or graphics). Also, any or all of the user interfaces of the disclosure may be any type of user interface, to include portable use interfaces (e.g. smart phones, tablets, any smart device, etc.). The phrase "smart device" means a wired or wireless context-aware electronic device capable of performing autonomous computing and connecting to other devices for data exchange. Also, communications between users (e.g., data entry users 131 and project manager uses 141) and between system components may be by way of any of several ways as known to those skilled in the art, such as through direct (wired) connection, wireless connection such as by smart device or smart phone, etc. Wireless communications may be, e.g., Bluetooth, Bluetooth low energy, ZigBee, cellular networks to include 4G and 5G, WiMAX, and other wireless networking types or protocols.

In one embodiment, one or more of the data communications of the system 100 comprise or are enabled by a system app that performs one or more of the functions described above with respect to a user device. For example, the system app may allow the data entry user 131, by way of the system app, to input and/or receive data from logic engine 110. As another example, the user 131 may use a system app to interact with the logic engine (in addition to or alternatively from a GUI 130). (The term "app" or "application" means a software program that runs as or is hosted by a computer, typically on a portable computer to include a portable computer such as user devices or smart phones and includes a software program that accesses web-based tools, APIs and/or data).

The one or more databases associated with the document form export system 100, such as system database 120, comprise a computer-readable storage media. It is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

In one embodiment, the databases and/or associated data (e.g., form groups, field templates, etc.) associated with the document form export system 100 and/or all or some elements of the system 100 operate in the cloud. (The phrase "cloud computing" or the word "cloud" refers to computing services performed by shared pools of computer resources, often over the Internet). In one embodiment, some or all of the computing or services or operations of the logic engine 110 are performed in the cloud.

In one embodiment, one or more of the user interfaces and/or user interface devices (e.g., 130, 140) and/or the logic engine 110 operate in a respective client-server arrangement. (The phrase "client-server" or "client-server architecture" means a shared computer architecture in which the server hosts, delivers and manages the majority of the resources (e.g., computing resources) and services to be consumed by a client. There may be multiple clients connected to a single server over a network or internet connection.

Figure 2:
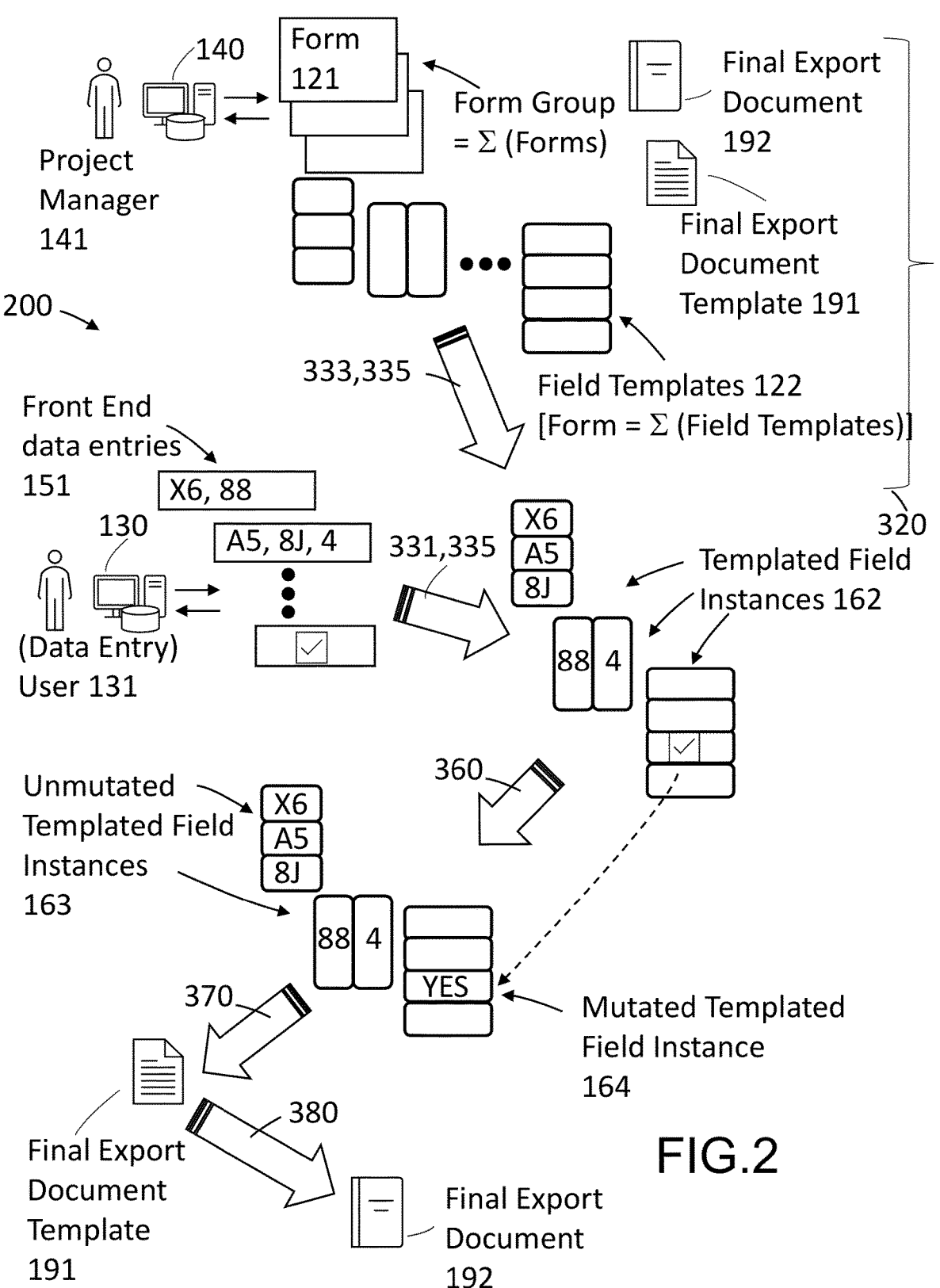
FIG. 2 is a schematic flow chart of one embodiment of a method of use of the document form export system of FIG. 1.

FIGS. 2 and 3 depict flow charts of embodiments of methods of use 200, 300 respectively of the document form export system 100 of FIG. 1. Note that in some embodiments, some functions (e.g., any of the identified steps 320 through 380 of FIG. 3) may be absent, occur in a different order, or include other functions or steps not shown. The methods 200 and 300 are similar and are discussed in parallel for conciseness and to increase clarity of the description and will reference aspects of the document form export system 100 of FIG. 1. Note that some of the steps of method 300 of FIG. 3 are identified as wide hollow arrows with respective element numbers in FIG. 2.

The method of use 300 of the document form export system begins at step 302. After completing step 302, the method 300 proceeds to step 310.

At step 310, a document form export system is provided. The document form export system may any of the embodiments described in the disclosure, such embodiments comprising any combination of features described in the disclosure. The document form export system will comprise a system database 120 having a non-transitory computer-readable storage medium, the system database configured to store system data, a logic engine 110 comprising a computer processor, the processor operating on the system database, and a user interface 130. After completing step 310, the method 300 proceeds to step 320.

At step 320, the substantive method of use of the document form export system 100 begins with a system initialization. During system initialization, the project manager 141 or other designated party selects a set of data entry users 131 who enter data (see step 330) into customized data entry forms stored on the system database 120 and selected by the project manager 141.

The project manager 141 or other designated party also selects one or more form groups by way of user interface 140, each form group comprising a set of forms 121, in turn each form 121 comprising a set of field templates 122. See FIG. 2. The field templates 122 are used on the front end to render the fields for data entry. Users may manipulate form groups and the templates (although typically only the project manager 141 will edit the templates and form groups though); there are some backend functionality tied to this, but these entities are interacted with and used on the front end. Note that typically form and/or field templates are configured prior to a user entering data.

Furthermore, the project manager 141 or other designated party may select a final export document 192 type, as associated with a final export document template 191. In one embodiment, the "other designated party" may be a state historical preservation office (SHPO) official or designee. The final export document 192 type defines the end product output of the document form export system. In one embodiment, the final export document 192 type is one of a pdf document and a word document. (Note that the selection of a particular final export document, in some embodiments, is not performed during initialization, but rather is performed as a later step, such as after any required data field export actions are performed, as described below). After completing step 320, the method 300 proceeds to step 331.

At step 331, a set of data field instances are received by the processor. Such data field instances may be provided to the processor by any combination of human entry (via, e.g., the user interface 130) or automated means (e.g., by way of the system database 120). Stated another way, the one or more users 131 of the set of users 150 enters data as data entries 150 by way of user interface 130. (See FIG. 4A for an example set of data entries provided by a user 131 to the system 100). These data, as entered by the user 130, are considered "front end" data in that they are visible by the user by way of the user interface 130.

The data entries 150 may be made into customized data entry forms (which may be selected by the project manager 141 at step 320), which may be unique for each of the users 150 of the set of users 150. The data entries 150 are received by the processor. After completing step 331, the method 300 proceeds to step 333.

At step 333, a set of data field templates associated with each data field element is retrieved from system database 120. Stated another way, each data entry (also termed a data instance or a data field instance) is matched or mapped or assigned to an associated data field template 122. After completing step 333, the method 300 proceeds to step 335.

At step 335, the associated data field template 122 for each data field instance is added to the particular data field instance to form a templated data field instance 162. In FIG. 2, sample data entries comprise alphanumeric data such as X6, 88, etc., and also picklist data such as a checked box.

Note that one or more of the data field templates 1001 may comprise a data field export action, aka data mutation action. One example of a data field export action is a conversion of a checkbox aka picklist data element to a text element; stated another way, converting a checked box to a Yes as shown by actions shown in step 360 of FIG. 2. After completing step 335, the method 300 proceeds to step 340.

At step 340, a query is made (within the backend of the system) to determine if data entry of data entries 150 is complete. If the reply is YES (meaning data entry is complete and no additional data must be entered), the method 2300 proceeds to step 350. If the reply is NO (meaning data entry is not complete and more data must be entered), the method 300 proceeds to step 331.

At step 350, a user requests the system to perform export processing. (Note: in some embodiments, such a request may be made at another time or sequence ion method 300, e.g., such as part of initialization step 320). After completing step 350, the method 300 proceeds to step 360.

At step 360, any required export actions, as indicated or present in a particular templated field instance, are executed; such an operation creates respective mutated templated field instances 164 (shown as step 362 in FIG. 3). Stated another way, any data field export actions of templated field instances are executed to create one or more mutated templated field instances. Those templated field instances that do not require an export action are deemed or designated unmutated templated field instances 163 (shown as step 364 in FIG. 3). As described above, FIG. 2 depicts a particular templated field instance 162 comprising a checkbox, the particular templated field instance 162 comprising a checkbox being converted to a particular mutated templated field instance 164 (i.e., text of "YES"). After completing the set of steps 360, 362, and 364, the method 300 proceeds to step 370.

At step 370, each of the unmutated templated field instances and the mutated templated field instances are routed to designated areas of the final export document template 191 to create a populated final export document template, such routing in one embodiment performed with aid of or as enabled by data pointers. After completing step 370, the method 300 proceeds to step 380.

At step 380, the system outputs a final export document 192 from the populated final export document template. After completing step 380, the method 300 proceeds to step 398 and the method 300 ends.

The field mutation process may be described in more detail as follows:

Some methods of meeting these requirements rely on creating new proxy fields that are inserted to retain formatting in a dynamic manner.

Some methods are used to mutate the input data into agency defined coding, e.g. different artifact type code designations for CRM. This contributes to the flexibility by allowing users to create efficiencies for additional users with less training, or removing a research requirement.

There is a requirement for field inputs to be created based on a separate form element's input. This requirement is based on the users' need to filter which inputs are available and create additional efficiencies for large and potentially untrained groups of users.

Depending on the quantity of data included in an input and the nature of the predefined template (Static or Dynamic), a new field input may be created to accommodate for excess data in a preformatted manner for Continuation pages or a separate field input's export action. This new field must allow customization of the data to add labels and any other formatting to increase readability for the output. The quantity of data can also determine changes to the consumed output template, this is a requirement to accommodate larger insertions or omissions of form elements, i.e. completely remove a section or table elements.

Mutations are used to set default values for existing data inputs or a new input in some cases. There is a requirement to have a field input with data delimited, for example, with commas to create each value as a new field input. It can duplicate fields, and mutate the value of the new data input in predetermined manners.

Some requirements involve automatically selecting a value for a specific "picklist" type field input based on another field input value. "Picklists" are a special type of field that uses a predetermined group of values that is selectable by the user i.e. a checkbox, dropdown etc.

There exists some internal requirements that the system needs to meet the requirements of the expected output depending on the format. Various outputs require different data values to achieve a similar result. An example of this is changing a checkmark value to "Yes" or "No" to process the field as "checked" properly.

Another internal requirement is changing the pointer that is used to determine the location of the data value. This is for limitations of our export tools, and for data integrity.

The table mutation process may be described in more detail as follows:

It is a common requirement for forms to include cell based structural data elements, which we refer to as "tables." A Table consists of relational fields organized by a "row" or a repeatable group of field data inputs. These elements are especially important and require specific internal systems to manage the data to meet the integrity and formatting requirements of the output. The rows can be required to retain a specific collation in the export, this requires special mutations in the pre export system to handle. Another requirement is creating a single field input based on the aggregate data of a table. Exports are required to use predetermined calculations used on an aggregation of the table data, which can be mathematical or predetermined values.

A collection of data can consist of multiple templates, depending on the users' needs. The system accommodates for predetermined mutations on specific data elements based on the template composition of the collection of data. An example of this accommodation is a checkbox field that is created and marked true if a "Continuation Page" template exists in the group. Another requirement involving the consumed predefined template, is determining which one is used on which appendix data collections are included in the group, this is required to maintain the export requirements.

The continuation mutation process may be described in more detail as follows:

When using static predefined templates, it is required for specific field inputs to calculate and mutate the data by splitting the data value into separate form and field inputs to be exported to a specific type of template called a "Continuation Page". We use the font style, size and predetermined configurations determining the pixel size to mutate the separated data in preformatted and user customized ways.

The form group mutation process may be described in more detail as follows:

Within a form group we are required to enforce a collation for the contained form elements data. This is predetermined and used to order the forms in an efficient and readable ordering set by the designer of the forms. We do this by using configurations and form pointers in combination with the modules in the pre-export process.

The appendice mutation process may be described in more detail as follows:

It is common for forms to require the use and embedding of images or other similar file types. By using a special set of predefined templates, users are able to add in "Appendix" forms which are predefined templates specifically for the purpose of containing data which has special external data attachments i.e., an image.

The (final) export process may be described in more detail as follows:

The export process is a separate system that expects to receive a finalized formatted dataset outlining the specifics of the data insertion into the predefined template. It is determined what type of export is required and sent to the system based on that configuration on the form data. Some target exports include the docx format from Microsoft (ISO 29500) and PDF format by Adobe (ISO 32000).

For docx exports, it is required to use special Microsoft word templates or "dotx" files to predetermine the formatting and field input data placement. To determine the field input data placement it is necessary to use a Microsoft Word feature called "content controls". These are set with a unique identifier that corresponds to the specific piece of field input data that needs to be inserted there. These dotx files are set up beforehand and require some basic Microsoft Word skills, to meet the requirements of formatting. These can be static or dynamic, meaning the field inputs can either be set to a specific height or can be allowed to change in size based on the quantity of data being input. To accomplish the requirements of tables, a special content control "wrapper" is used to encapsulate the content controls for each cell input. It is required to duplicate these and dynamically add rows as needed. For static templates, the use of Continuation Pages is required.

Depending on the designed needs of a form, sometimes a pdf file is required as an export. For now these are limited to static types, making use of Continuation Pages as needed. PDF files are required to input data into specific locations on the export, to meet this requirement, input fields are used with unique identifiers on the field data pointing to the location on the exported pdf.

Exports are required to be zipped in a directory containing the export for each form group the user is requesting and sent to the client to be downloaded.

Furthermore, regarding the mutation/restructuring process:

The form export system receives data using predefined schemas and navigates through each form element to decide how the form element needs to be mutated if at all. This is accomplished by looping through specific parts of the received formatted data. These mutations occur in the pre-export process before the data is sent to the export process. The mutations will only take place on a form element that has a designated export action.

The timing and the manner that the data is mutated varies by element type and by the specific element's configuration. The timing is important for accuracy and performance purposes when this process is happening on larger than normal datasets.

At each form element, a specific property stored on an element template document determines if an export action exists, and which export action is required. It then identifies the specific process indicated by the export action, executes it, then replaces the form element with a new version with the identified mutations completed.

There are many different requirements for the form elements to be mutated. These vary by element type (i.e., section, field) and export action type. Export actions are highly customized, and require some collaboration with the development team, so can vary by form element template requirements as well.

The timing of the mutations matters for performance and accuracy. Essentially it is required to mutate certain form element types before others, so that the later export action mutations are mutating the correct thing and retaining the overall data structure.

It is required to set up unique identifiers for each form group to designate the resulting export's filename. This happens first because this data could be required by any other form element.

It is required to set up storage in memory to capture continuation page requirements from all of the forms within a form group, then compile and build the required form element at the end. This needs to happen in the beginning as well because every form instance is required to interact with it.

It is required to modify the quantity of field level form elements in some cases, and these export action types happen at the section form element. This is related to any mutation of the quantity of field elements. For example adding in a new field that did not exist before, would be a section level export action.

Field level elements are the most common of all the export action type requirements. These types of processes are designed to mutate any property on a given field in many different highly customized ways. Within the field level element export action type there are several subtypes based on the input type and export type of the field element. It is required to make field type specific export actions to picklists, notes, dates, table, text fields, etc. Table requirements are slightly different in that they abstract another layer of field level export actions.

The last form elements to be mutated are export actions relating to the target predefined export template, form instance interpolation or form instance collation requirements.

An example of a form element mutation involves changing a checkbox to a text with a predefined value if the checkbox is selected; this is used for requirements that need to mutate the value to display text based on a picklist selection.

A field instance can come in with these properties: this example is for a situation where the user required a checkbox on the front end, but have the checkbox actually exported as text instead of a box checked true or false.

The FIGS. 2-3 describe system operations involving field instances and field templates. However, the system may also process companion form instances and form templates which handle, for example, changes in structure of data presentation such as table formats. For example, a user may enter, via customized data input, a data instance defining a table of 4 columns yet ultimately the final export document requires a table of 4 columns of different data elements (see description of FIGS. 4A-B below).

For example, a Form Template action may change the targeted final export type to a dotx file based on whether or not there are any rows in a specified table; the idea is to have drastically different formatted exports for the same data.

The action mutates the form instance.

Figures 4A, 4B:
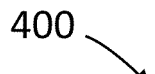
FIG. 4A is one embodiment of a set of data entries to a document form export system of the disclosure, as presented to a data entry user on the user interface of the document form export system.
FIG. 4B is one embodiment of a final export document showing the set of data entries of FIG. 4A.

FIGS. 4A-B provide a paired example of the document form export system operating on data by way of the system processor. FIG. 4A is an example of data entries 150 input by a user 131 by way of user interface 130. The data 400 comprises two identified features, each with a latitude/longitude location provided in degree, minute, and second, and a checkbox as to if the features is considered a cultural feature. FIG. 4B is the companion example to FIG. 4A in which the data 400 has been processed by system to create data 401 in a final export document 192 using the processes of the disclosed invention. Several changes are apparent. The latitude/longitude location provided in degree, minute, and second of data 400 has been changed to latitude/longitude in decimals, and the affirmative checkbox of data 400 has been changed to a text YES. Each of these changes are performed by way of data field export actions as described above. Also, the structure of the table of data 400 vs. data 401 has changed, e.g., column one of data 400 is feature vs. column one of data 401 is Geo Zone. Note the Geo Zone are defined geofenced zones (defined by final export document template and/or the form template) which determines if a given input data 400 (e.g., firepit feature lat/long) sits within a given geo zone.

In one embodiment, the customized field action template system may be an app of a document form export system. In one embodiment, the document form export system, of which the customized field action template system is compatible with, may be an app. (The term "app" or "application" means a software program that runs as or is hosted by a computer, typically on a portable computer to include a portable computer such as user devices or smart phones and includes a software program that accesses web-based tools, APIs and/or data).

Figure 5:
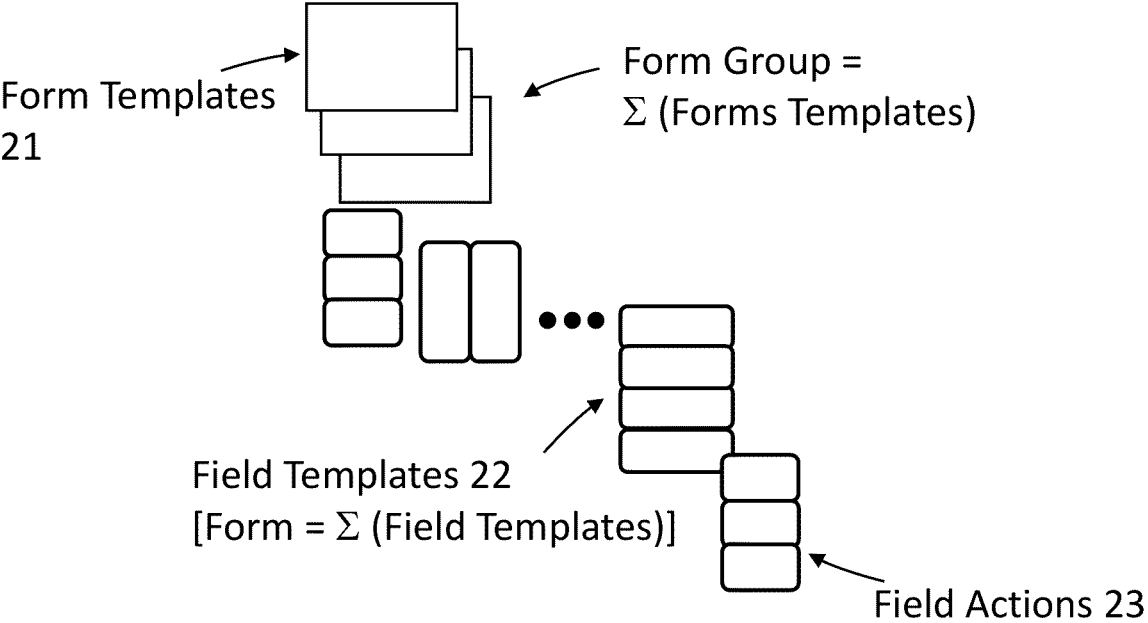
FIG. 5 is a depiction of one embodiment of components of the customized field action template system of the document form export system of FIG. 1.

As depicted in FIG. 5, the Field Action system requires one or more Field Templates 22 belonging to one or more Form Templates 21 with one or more actions 23 and action data associated with a particular Field Template 22. The Field Action system also requires the action system to be set up in the application (e.g., set up in the larger document export system). Then working with the specific code requirements of the action, and "useField" module (the "useField" module is a particular software component), the field will perform its designated function. Users may design the form to match the expected or perceived requirements and to fit their management style when working with a team.

(Note that the system of FIG. 5—or any embodiment of the document export system—may be used by a variety of users, to include those in an office setting and those on site, such as at a research site or project site. Such users may have a variety of communication connectivity available, e.g. some may have connectivity to the cloud and/or internet, and some may not).

The Field Action system is designed to allow for specific nuance form changes to help a user complete their recording tasks in the most efficient and effective manner possible. This is done by allowing users to define specific modules or systems to a specific Field Template 22 and will be applied on the users' client device while recording data. These specific module definitions are known as Field Actions 23. The purpose and mechanisms of these systems can vary greatly depending on the specific needs of the defined system. These systems work through a generalized module that is meant to assist with the basic field functions to accomplish the Field Action's system goals along with the field type's basic functionality.

These actions may include functions to hide fields. These actions may include modifying values for itself or other fields. These actions may include enabling or disabling other fields based on a specific value. These actions may be used to "link" fields together, and maintain the same value across multiple fields. These actions may be used to auto populate certain fields with values from other fields, dynamic values or preset values. These actions may change another field's value based on the specific data recorded. These actions may format values to be more readable for a user recording. These actions may perform calculations. These actions may remove options if it's a picklist and desired. These actions may hide the keyboard on tablet/mobile devices.

A field's action is read and potentially acted upon at various stages in the application. For some actions there are some initial functions that must occur for the specific action to complete its requirements. Others are meant to happen while the recording is taking place. Some actions are required to happen after the user is finished recording in a field. Depending on the action it will perform its functions at different stages, which is defined by the action's overall system architecture.

Generally, the customized field action template system of a document form export system may handle fields in a generalized manner and may apply any of the functionality that the user defined across field types as well as the core functionality that the fields need to work in the cloud or offline. (The phrase "cloud computing" or the word "cloud" refers to computing services performed by shared pools of computer resources, often over the Internet).

One way to describe the customized field action template system of a document form export system is like a bucket of fields that are setup to handle any specific functionality required by the field type or defined by the user in the actions. An example of this is if a user wants to set up a specific field that is a text field, to instead be a dropdown and auto populate with a specific option selected, this system will handle that. Another example could be setting up fields to change other fields based on the selected value, or setting a date field to use the current date when they create the form. The user can simply hide fields which the user does not want their field team to even have to see in the form. Thus, any special functionality that a user could want the fields to do while the form is being filled out may be done with this customized field action template system of a document form export system.

There are certain dependencies that the customized field action template system requires to function properly. The system requires there to be Field Template documents (see element 22 in FIG. 5) to store the information required for the action to function. There must be an action applied to the FieldTemplate (the term "FieldTemplate" refers to a software implementation of the Field Template 22 of FIG. 5) that requires the special functionality represented by the action. These actions (e.g., the Field Actions 23 of FIG. 5) are assigned from a list of actions that have been setup in the application. There must be extra data associated with the action stored on the FieldTemplate to handle specific configurations required for the FieldTemplate (i.e. phone number format-localization data). The actionData may be empty but most actions require some specific data to fulfill the requirements.

The (field) template and (data) instances may be stored on either the cloud database aka "db" (online) or the device db if no internet is available. Then any action system will make updates to the corresponding db (if updates to the documents are required). The action systems must be set up in the software code for them to work or be assigned to a Field Template. For new actions, a developer must build out the new actions as a feature, then the new actions will be accessible by the user to assign to a Field Template. There must be a conditional with the specific action flagged to begin the system's process on the field that it is required to run on. There also must be a module that facilitates the requirements themselves. Sometimes these work with the useField module, other times they are integrated in other ways.

A method or process of use of the customized field action template system starts with a user making edits to a Field-Template (e.g., element 22 of FIG. 5) and then selecting from a list of actions (the Field Actions 23 of FIG. 5) to assign one or more to the Field Template. The user will then enter in any specific data needed for the selected action. Then the user creates a new form group (Form Group 21 of FIG. 5) using the (field) template that has been edited. Depending on the action, activities will occur at different points during the process. In the application, when a Form-Group is created/accessed any of the reactive actions will be initialized. Otherwise, the FieldType will be set up and the action will be set up within the specific Field Type or the useField module. As a user is editing a field, some actions will take place. Some particular types of actions, called reactive field actions, are checked while a user is typing and any functionality will be applied during the edits. The phone number formatting action is an example of this, and as the user types in numbers, the system will mutate the value to format it to its specifications (i.e., US phone number formatting). See FIG. 6. When a user blurs out of most fields, or makes a selection in picklist type fields, some actions will take place and the systems will be applied at that point.

Actions may cause data mutations which will normally affect the value of the field instance. Some actions will require modifying the html used to render the field. Generally, anything that is related to how the field appears in the application will be modifying the html. Linked fields are a type of action that is meant to be reactive, meaning some sort of effect occurs after another event occurs. One case of this is used to maintain the same value across multiple fields across multiple forms within the same form group. This is a common action because a lot of forms will contain the same data. These actions are set up initially when a user creates the Form Group. The linked action creates a new field instance that is shared amongst all the other linked field instances. Updates made by any of the linked fields will mutate the data on the new shared field instance and all of the "sibling" linked fields will receive updates from the new shared field. This specifically happens when the data for a field is submitted.

FIG. 6 is a flow chart of one embodiment of a method of use 600 of the customized field action template system of a document form export system of the disclosure. Note that in some embodiments, some functions (e.g., any of the identified steps 604 through 632) may be absent, occur in a different order, or include other functions or steps not shown. The method will refer to elements of FIG. 5 and FIG. 3. The method 600 starts at step 602 and ends at step 636.

At step 602, the method 600 starts and proceeds to step 604.

At step 604, a document form export system is provided. This step is similar to the step 310 of method 300 of FIG. 3. After completing step 604, the method 600 proceeds to each of steps 608, 612, and 616, which are similar to respective steps 331, 333, and 335 of method 300 of FIG. 3. After completing step 616, the method proceeds to step 620.

At step 620, a particular set of field actions 23 are received by the customized field action template system of a document form export system. After completing step 620, the method proceeds to step 624.

At step 624, the particular set of field actions 23 are assigned to particular data field templates 22. After completing step 624, the method proceeds to step 628.

At step 628, the particular set of field actions 23 are executed, to include any reactive field actions. After completing step 628, the method proceeds to step 632.

At step 632, any data mutations are addressed. After completing step 632, the method proceeds to step 636 and the method 600 ends.

There are certain requirements to building out new actions. First, the exact requirements of an action that is needed to be built out must be defined. This involves meeting with users and discussions amongst the development team to determine the best architecture for the new action system. Determining which field types will actually be able to use or need the action is important. Determining the best part of the codebase and field life cycle to build in the action system is another requirement to building action systems. Because of the nature of the actions system overall, where these are built out will vary greatly and can exist in other domains of the app. These action systems must maintain the document and its data requirements for its Field Type. This is a requirement so that these entities continue to function with other systems in the application. Some actions will only be available for specific field types, while others will be available to any field type; the availability of actions depends on the nature and design of the action.

Some actions are much more straightforward, for example the phone number formatting action which formats the input number to the specified phone number formatting while the user types. The Phone Number field type handles this action, and directly mutates the data to the required format as the user makes changes to the field.

A module called useField assists in all the Field Types general events. This module handles storing the data as the user makes changes to a field and handles the submission process when the field's value needs to be submitted. It also handles some actions that will take place at various events. This module uses action flags to determine when an action's system needs to be applied and will happen during one of these generic events: on change, on blur, on submit and on focus.

Note that although the document form export system and method of use has focused on external in field environments and human operators, the system and method may be applied in other environments. For example, the system may be applied in: solely interior environments such as office settings, with use of automated data input rather than human data input, etc.

The exemplary systems and methods of this disclosure have been described in relation to document form export. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of using a document form export system comprising:

providing a document form export system comprising:
a system database having a non-transitory computer-readable storage medium, the system database configured to store system data, the system data comprising at least one final export document template and a set of forms, each form comprising a set of data field templates configured to be added to a data field instance, at least one of the set of data field templates having a data field export action;
a logic engine comprising a computer processor, the processor operating on the system database; and
a user interface;
receiving, by the processor, a set of data field instances;
retrieving a data field template associated with each of the data field instances;
adding the data field template associated with each of the data field instances to each of the data field instances to create a set of templated field instances, the set of templated field instances comprising at least one templated field instance with an associated data field export action and a set of templated field instances not associated with any data field export action;

executing the associated data field export action of the at least one templated field instance with an associated data field export action to create a mutated templated field instance;
designating the set of templated field instances not associated with any data field export action as unmutated templated field instances;
receiving a selection of a particular final export document template;
routing the mutated templated field instance and the unmutated templated field instances to particular data locations within the particular final export document template to create a populated final export document; and
exporting, from the populated final export document, a final export document.

2. The method of claim 1, wherein the final export document is one of a pdf document and a word document.

3. The method of claim 1, wherein the data field export action converts a checkbox data element to a text element.

4. The method of claim 1, wherein at least one data field instance is alphanumeric data.

5. The method of claim 1, wherein the data field export action is a third party defined code.

6. The method of claim 1, wherein the data field export action is a picklist.

7. The method of claim 1, wherein the data field export action is a dropdown.

8. The method of claim 1, wherein the populated final export document is in JSON format.

9. The method of claim 1, wherein:
the system database is further configured to store a set of field actions; and
the set of data field templates are further configured to receive the set of field actions, and at least one of the set of field actions comprises a reactive field action.

10. A document form export system comprising:
a system database having a non-transitory computer-readable storage medium, the system database configured to store system data, the system data comprising at least one final export document template and a set of forms, each form comprising a set of data field templates configured to be added to a data field instance, at least one of the set of data field templates having a data field export action;
a logic engine comprising a computer processor, the processor operating on the system database; and
a user interface; wherein:
the logic engine has machine-executable instructions operating to:
receive, by the processor by way of the user interface, a set of data field instances;
retrieve a data field template associated with each of the data field instances;
add, by the processor, the data field template associated with each of the data field instances to each of the data field instances to create a set of templated field instances, the set of templated field instances comprising at least one templated field instance with an associated data field export action and a set of templated field instances not associated with any data field export action;
execute, by the processor, the associated data field export action of the at least one templated field instance with an associated data field export action to create a mutated templated field instance;

designate the set of templated field instances not associated with any data field export action as unmutated templated field instances;

receiving, by the processor, a selection of a particular final export document template;

route, by the processor, the mutated templated field instance and the unmutated templated field instances to particular data locations within the final export document template to create a populated final export document; and export from the populated final export document, by the processor, a final export document.

11. The system of claim 10, wherein the final export document is one of a pdf document and a word document.

12. The system of claim 10, wherein the data field export action converts a checkbox data element to a text element.

13. The system of claim 10, wherein at least one data field instance is alphanumeric data.

14. The system of claim 10, wherein the data field export action is a third party defined code.

15. The system of claim 10, wherein the data field export action is a picklist.

16. The system of claim 10, wherein the populated final export document is in JSON format.

17. The system of claim 10, wherein the data field export action is a dropdown.

18. The system of claim 10, wherein:

the system database is further configured to store a set of field actions; and the set of data field templates are further configured to receive the set of field actions, and at least one of the set of field actions comprises a reactive field action.

\* \* \* \* \*